(12) United States Patent
Wright

(10) Patent No.: US 12,125,064 B2
(45) Date of Patent: *Oct. 22, 2024

(54) MOBILE DEVICE POP-UP LOCATION-BASED REAL-TIME OFFER GENERATION

(71) Applicant: Truist Bank, Charlotte, NC (US)

(72) Inventor: Gregory Wright, Kennesaw, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,676

(22) Filed: Apr. 19, 2022

(65) Prior Publication Data
US 2023/0334525 A1   Oct. 19, 2023

(51) Int. Cl.
G06Q 30/0251   (2023.01)
(52) U.S. Cl.
CPC ..... G06Q 30/0267 (2013.01); G06Q 30/0261 (2013.01); G06Q 30/0269 (2013.01)
(58) Field of Classification Search
CPC ........... G06Q 30/0267; G06Q 30/0261; G06Q 30/0269
USPC ............ 705/14.35, 14.58; 709/217; 707/751; 455/456.3
See application file for complete search history.

(56) References Cited

U.S. PATENT DOCUMENTS 6,757,661 B1 *   6/2004   Blaser ................ G06Q 30/0277
   705/14.54
8,601,004 B1 *   12/2013   Mahadevan ....... G06Q 30/0261
   707/751
2002/0077890 A1 *   6/2002   LaPointe ............ G06Q 30/0227
   705/37

(Continued)

FOREIGN PATENT DOCUMENTS

KR   20170026264 A   3/2017

OTHER PUBLICATIONS

Jacinda Santora, How to Create a Custom "Like Us On Facebook" Popup to Get More Fans, 2020 (Year: 2020).*

(Continued)

*Primary Examiner* — Tarek Elchanti
(74) *Attorney, Agent, or Firm* — Michael A. Springs, Esq.; Shumaker, Loop & Kendrick, LLP; Patrick B. Horne

(57) ABSTRACT

A system and method generate location-based real-time pop-ups to user portable devices utilizing a computing system storing target information and user profiles and providing a downloadable pop-up display application. A user portable device running the application sends user identification and current location information to the computing system. The computing system uses the current location and the stored user profile associated with the identified user to select relevant stored target information and send the selected information as pop-up data to the portable device across a wireless communication channel only when the user portable device current location is within the predetermined distance of the associated target location. The application generates pop-up images from the received pop-up data on the portable device display for use by the user in purchasing products and/or services from the targets. The user profiles include preferences that facilitate the target selection and the image display positioning.

20 Claims, 8 Drawing Sheets

(56) References Cited

U.S. PATENT DOCUMENTS

| | | | | |
|---|---|---|---|---|
| 2006/0236258 A1* | 10/2006 | Othmer | ............... | H04W 4/02 340/8.1 |
| 2006/0282533 A1* | 12/2006 | Steelberg | ........... | G06Q 30/0267 709/224 |
| 2008/0114762 A1* | 5/2008 | Fukuda | ................. | G06Q 30/08 |
| 2008/0201199 A1* | 8/2008 | Armstrong | ......... | G06Q 30/0255 705/7.32 |
| 2009/0187492 A1* | 7/2009 | Hammad | ........... | G06Q 20/3274 705/26.1 |
| 2010/0049599 A1* | 2/2010 | Owen | ................ | G06Q 30/0241 705/14.4 |
| 2010/0262464 A1 | 10/2010 | Monteforte | | |
| 2011/0066506 A1* | 3/2011 | Sung | ..................... | G06Q 30/02 705/14.69 |
| 2011/0173072 A1 | 7/2011 | Ross | | |
| 2013/0137464 A1* | 5/2013 | Kramer | ................ | H04W 4/021 455/456.3 |
| 2014/0108145 A1 | 4/2014 | Patel | | |
| 2014/0222956 A1* | 8/2014 | Courtney, III | ..... | G06Q 30/0259 709/217 |
| 2014/0307040 A1 | 10/2014 | Choi | | |
| 2015/0363816 A1* | 12/2015 | Poglitsch | ................ | H04W 4/02 705/14.35 |
| 2016/0132929 A1* | 5/2016 | Bandara | ................ | G06Q 30/02 705/14.58 |
| 2017/0236156 A1* | 8/2017 | Edelshteyn | ............ | G06Q 30/02 705/14.53 |
| 2017/0269799 A1 | 9/2017 | Rathus | | |
| 2018/0315090 A1* | 11/2018 | Greenberger | ...... | G06Q 30/0261 |
| 2019/0205939 A1 | 7/2019 | Lal | | |
| 2019/0295118 A1 | 9/2019 | Martin | | |
| 2020/0249993 A1 | 8/2020 | Dintenfass | | |
| 2023/0230094 A1 | 7/2023 | Taylor | | |

OTHER PUBLICATIONS

Guest Author, Location-Based Marketing: What Works and What Doesn't, 2019 (Year: 2019).

IMC, Promotion: Integrated Marketing Communication, 2020 (Year: 2020).

\* cited by examiner

MOBILE DEVICE POP-UP LOCATION-BASED REAL-TIME OFFER GENERATION

FIELD

This invention relates generally to the field of generating pop-ups for services and products, and more particularly embodiments of the invention relate to generating such pop-ups in real-time to a user mobile device based upon the user location.

BACKGROUND

An advertising technique used to convey information to people is the generation of a pop-up advertisement, proposal or offer that appears on the screen of a computer or mobile device obscuring a portion of the display. The pop-up may arise at any time during use of the computer or the mobile device and typically is based upon subject matter currently being viewed and recently viewed. The pop-up can be simply informational or can be interactive permitting a user to make selections and place orders.

BRIEF SUMMARY

Embodiments of the present invention address the above needs and/or achieve other advantages by providing systems and methods according to the following aspects of the invention.

According to a first aspect of the invention, a system for controlling location-based real-time pop-ups on user portable devices and reducing communication channel flow rate by reducing a number of pop-ups transmitted across the communication channel includes: a database; and a computing system operatively coupled with the database and wirelessly operatively coupled over a wireless communication channel with a user portable device comprising: at least one processor; a communication interface communicatively coupled to the at least one processor; and a memory device storing executable code that, when executed, causes the at least one processor to: run a pop-up generation software application that stores information for a plurality of pop-ups and a plurality of user profiles in the database, the information for each of the pop-ups including a location for a target associated with the pop-up; receive, across the wireless communication channel, user data including user identification and current location information from a user operated portable device, the user identification corresponding to one of the stored user profiles; respond to receiving the user data by comparing the current location information with the locations included in the stored information to select at least one of the pop-ups having an associated location within a predetermined distance of the current location; and transmit the information associated with the selected at least one pop-up as pop-up data to the portable device with instructions to display a pop-up image to the user of the portable device, wherein pop-ups are only transmitted across the wireless communication channel when the portable device current location is within the predetermined distance of the associated location rather than periodically transmitted, thereby reducing a flow rate of the pop-up data across the wireless communication channel.

The one stored user profile includes at least one user preference corresponding to at least one of a business type, a business, a service and a product and the computing system uses the at least one user preference to select the at least one pop-up.

When at least two of the pop-ups are selected, the computing system includes in the pop-up data sent to the portable device an order in which to display the pop-up images of the at least two pop-ups.

The pop-up image includes at least one of a code to be used at the time of purchase, a QR code to be scanned at the time of purchase and an interactive screen area for remotely placing an order.

The computing system is adapted to enable the portable device to download a pop-up display software application for generating the user data, for receiving the pop-up data and for operating the portable device to display the pop-up image.

The pop-up display software application operates the portable device to send user transaction information to the computing system and wherein the computing system receives and uses the transaction information to update the one user profile.

According to a second aspect of the invention, method for generating location-based real-time pop-ups to user operated portable devices and reducing communication channel flow rate by reducing a number of pop-ups transmitted across the communication channel includes the steps of: establishing a first database of information data related to a plurality of targets that desire to send pop-ups to users associated with a computing system, the data for each of the targets including a location of the target and information sufficient to generate an associated pop-up image; establishing a second database of user information data related to a plurality of the users associated with the computing system that desire to receive the pop-ups from at least one of the targets in the first database; operating a computing system to respond to receiving user data across a wireless communication channel, the user data including a user identification and a current location of a portable device sending the user data; operating the computing system to retrieve from the second database the user information data of the user corresponding to the user identification; operating the computing system to compare the received current location with the target locations stored in the first database and to select ones of the targets that are located within a predetermined distance of the current location; and operating the computing system to send pop-up data across the wireless communication channel to the portable device that sent the user data, the pop-up data including pop-up images associated with the selected targets, wherein the portable device receives and displays the pop-up images from the pop-up data, and wherein the pop-up data is only transmitted across the wireless communication channel when the portable device current location is within the predetermined distance of the selected target location rather than periodically transmitted, thereby reducing a flow rate of the pop-up data across the wireless communication channel.

The user information data includes a user profile for each of the users, each of the user profiles including preferences for at least one of types of the targets, individual ones of the targets, products from the targets and services from the targets and including operating the computing system to select ones of the targets that further match the preferences.

The computing system is operated to update the preferences based upon actual transaction information generated from purchase transactions made by the user.

The computing system generates the actual transaction information from credit card and debit card transactions made by the user.

The computing system includes in the pop-up data information setting a display order when at least two of the pop-up images are included in the pop-up data.

The computing system further selects the targets based upon learned use patterns of the user.

According to a third aspect of the invention, a method for displaying location-based real-time pop-ups on portable devices and reducing communication channel flow rate by reducing a number of pop-ups transmitted across the communication channel includes the steps of: operating a portable device to transmit user data to a computing system across a wireless communication channel, the user data including a user identification and a current location of the portable device; operating the portable device to receive pop-up data from the computing system across the wireless communication channel, the pop-up data including pop-up images related to products and services offered by targets located within a predetermined distance of the current location; and operating the portable device to process the pop-up data and show the pop-up images to a user of the portable device on a display of the portable device, wherein the pop-up data is only transmitted across the wireless communication channel when the portable device current location is within the predetermined distance from the locations of the targets associated with the pop-up data rather than periodically transmitted, thereby reducing a flow rate of the pop-up data across the communication channel.

The portable device is operated to show the images in a graphical user interface on the display, the graphical user interface being associated with the computing system.

A button is provided on the display and wherein the step of operating the portable device to transmit the user data is enabled by the user actuating the button.

The user identification is based upon a user name and a password required to communicate with the computing system.

The pop-up images are shown on the display in a predetermined order based upon a transaction frequency of the user.

The pop-up images include at least one of a code to be used at the time of purchase, a QR code to be scanned at the time of purchase and an interactive screen area for remotely placing an order.

The portable device is operated to send purchase transaction information to the computing system for updating a user profile of the user.

The portable device is operated to send preference information to the computing system for updating a user profile of the user, the preference information including at least one of a target type, a target, a service from a target and a product from a target.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
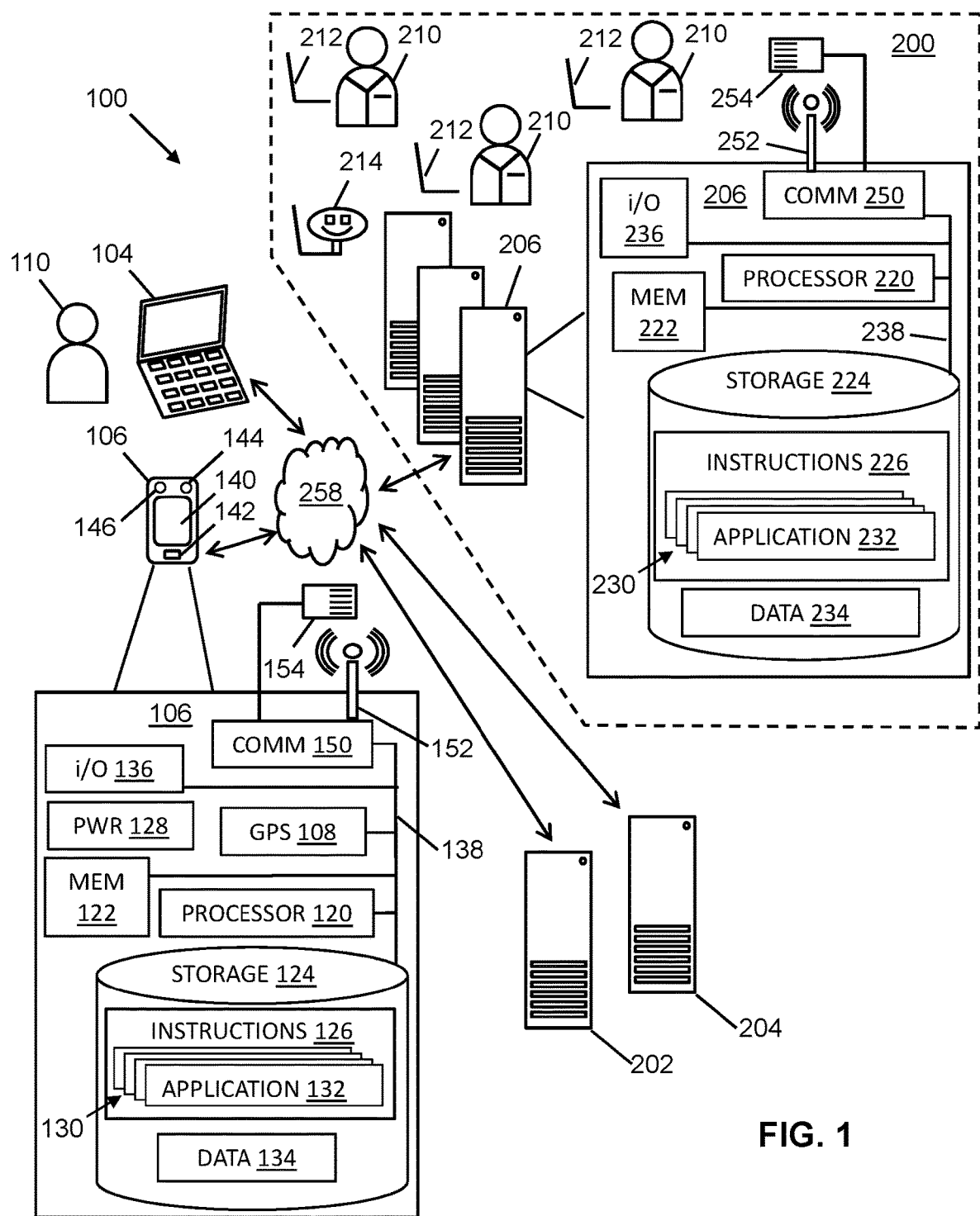

Having thus described embodiments of the invention in general terms, reference will now be made to the accompanying drawings, wherein:

FIG. 1 illustrates a computing system, and environment thereof, according to at least one embodiment.

Figure 2A:
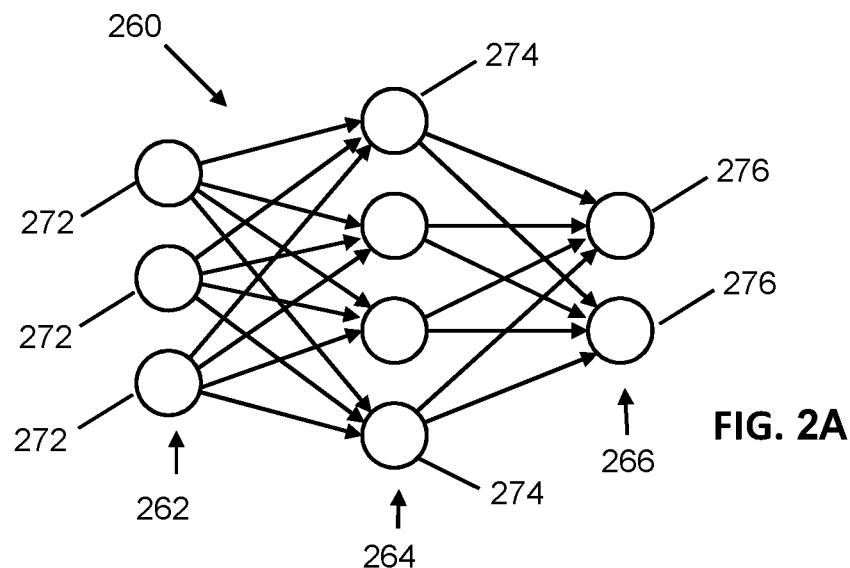

FIG. 2A is a diagram of a feedforward network, according to at least one embodiment, utilized in machine learning.

Figure 2B:
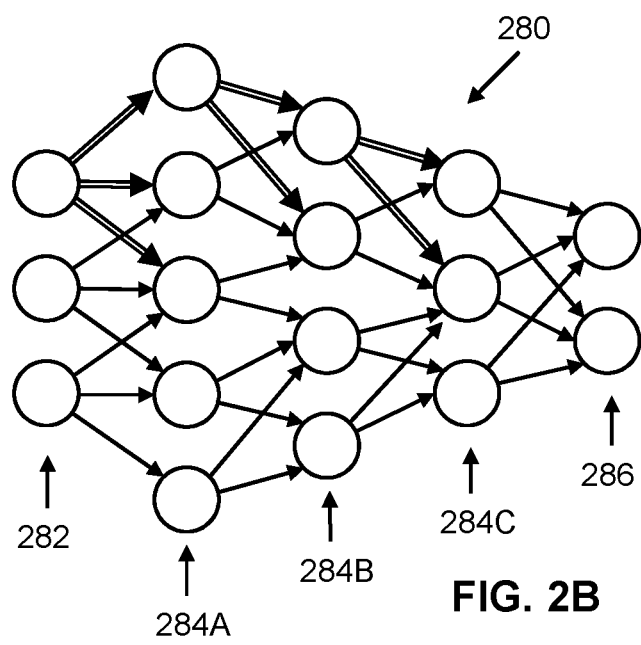

FIG. 2B is a diagram of a convolution neural network, according to at least one embodiment, utilized in machine learning.

Figure 2C:
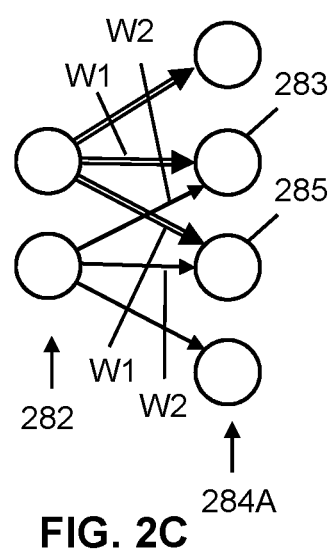

FIG. 2C is a diagram of a portion of the convolution neural network of FIG. 2B, according to at least one embodiment, illustrating assigned weights at connections or neurons.

Figure 3:
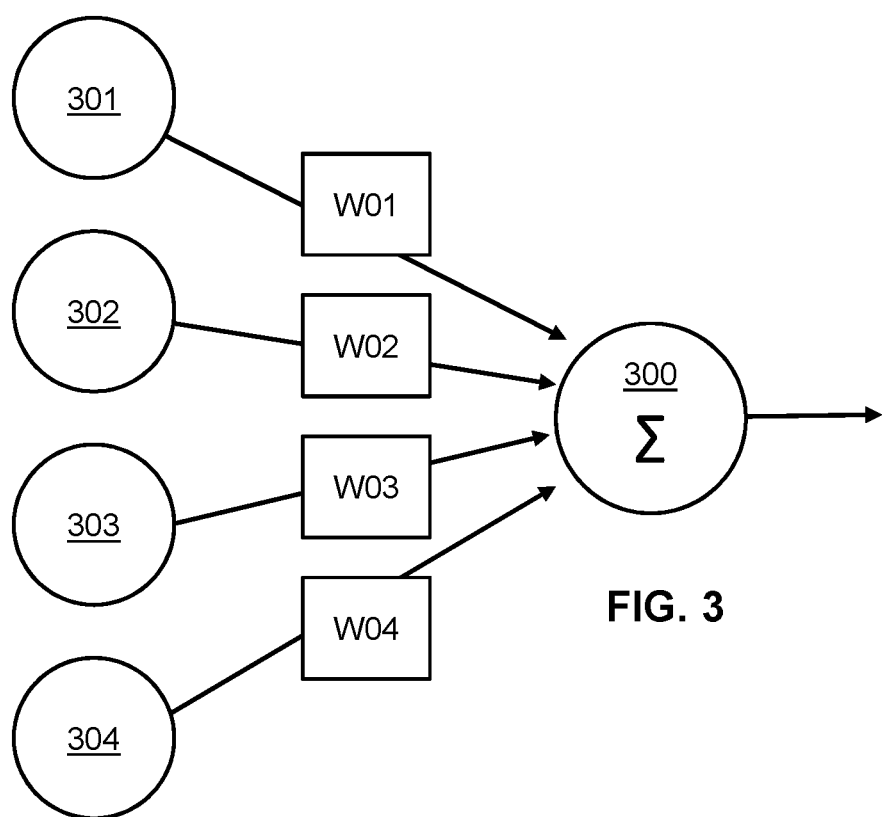

FIG. 3 is a diagram representing an exemplary weighted sum computation in a node in an artificial neural network.

Figure 4:
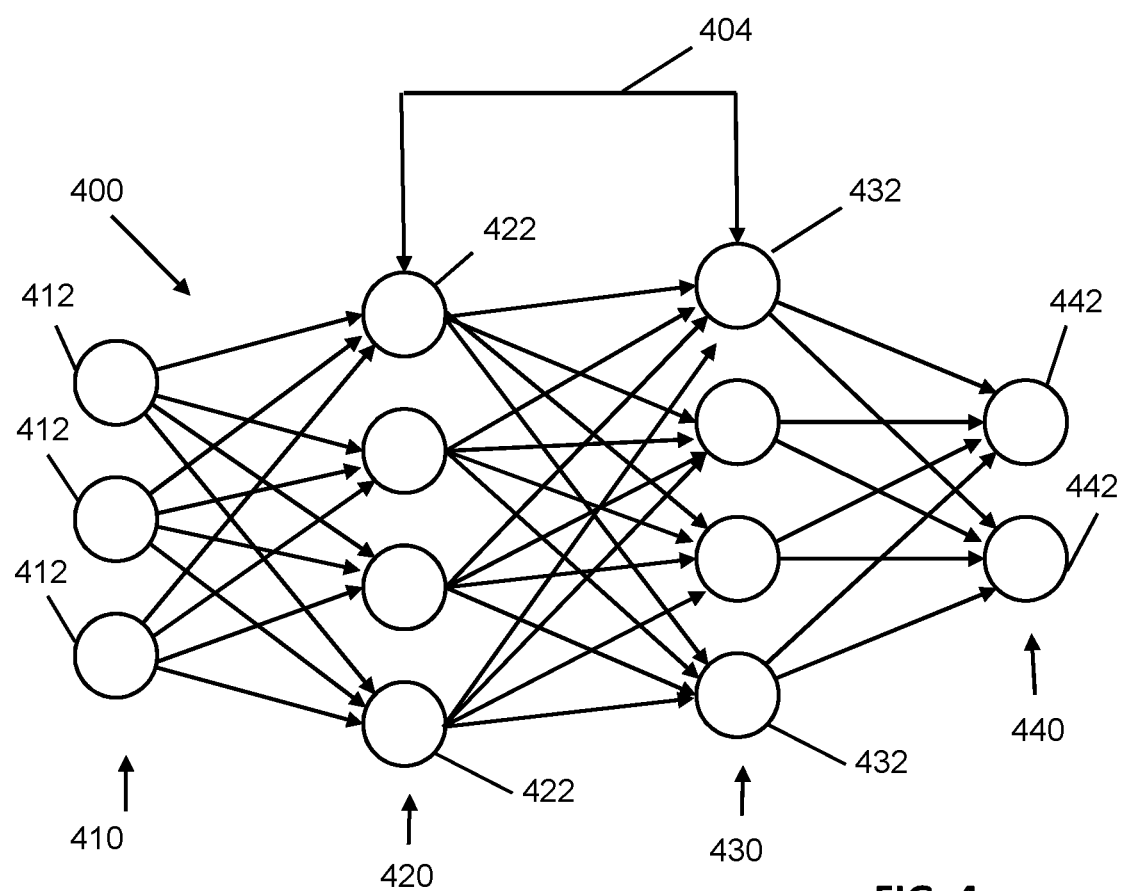

FIG. 4 is a diagram of a Recurrent Neural Network RNN, according to at least one embodiment, utilized in machine learning.

Figure 5:
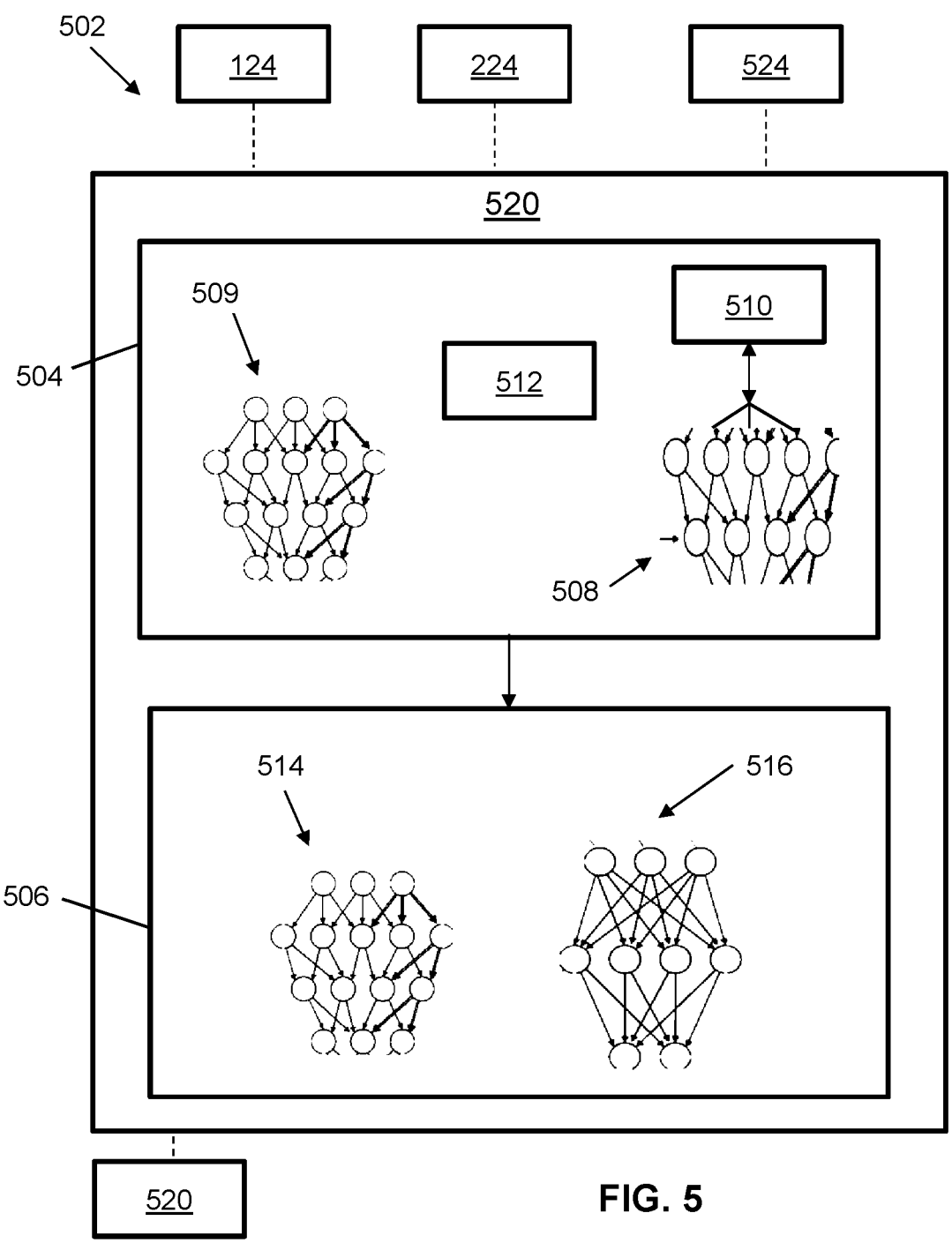

FIG. 5 is a schematic logic diagram of an artificial intelligence program including a front-end and a back-end algorithm.

Figure 6:
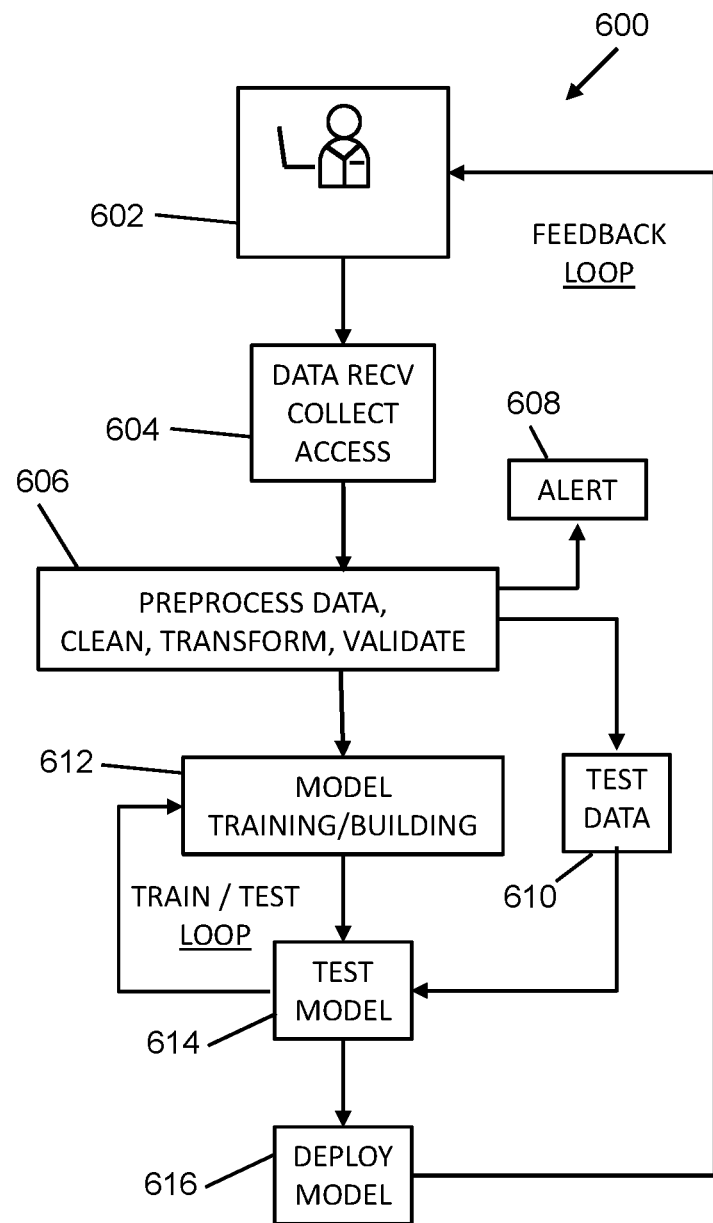

FIG. 6 is a flow chart representing a method, according to at least one embodiment, of model development and deployment by machine learning.

Figure 7:
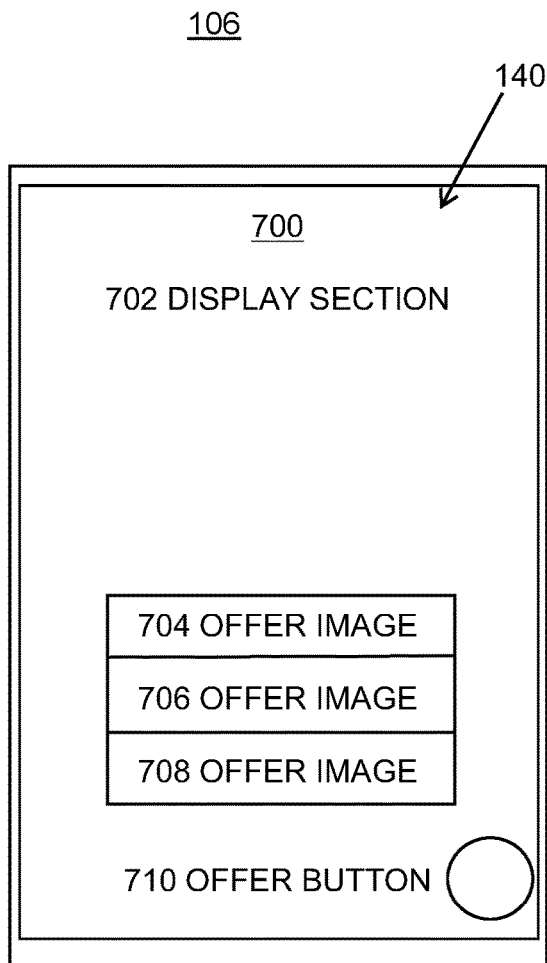

FIG. 7 illustrates a mobile device display with a graphical user interface according to at least one embodiment of the invention.

Figure 8:
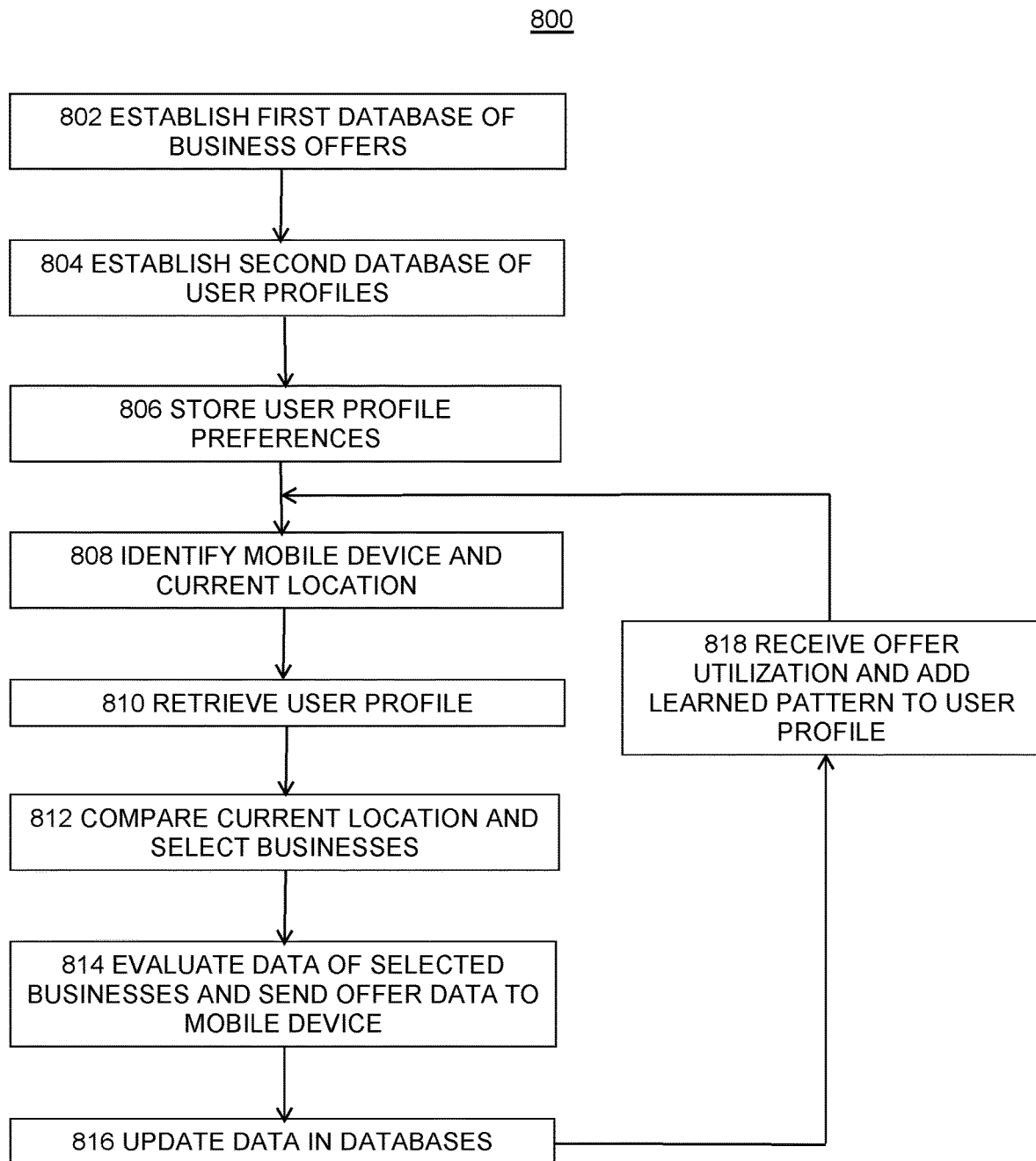

FIG. 8 is a flow chart representing a method, according to at least one embodiment of the invention, of operating a location-based real-time pop-up generator.

Figure 9:
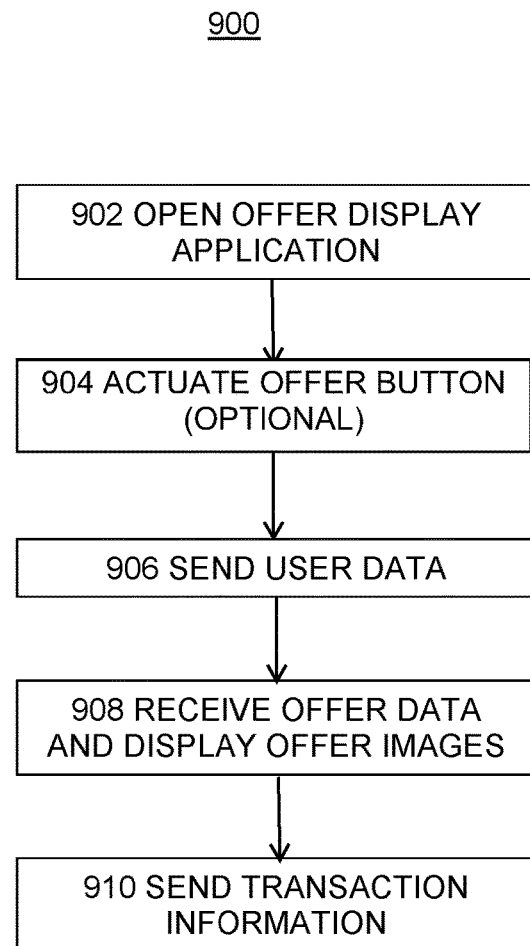

FIG. 9 is a flow chart representing a method, according to at least one embodiment of the invention, of displaying location-based real-time pop-ups on a mobile device.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable computing apparatus to produce a particular machine, such that the instructions, which execute via the processor of the computer or other programmable computing apparatus, create mechanisms for implementing the functions/acts specified in the flowchart and/or block diagram block or blocks.

These computer program instructions may also be stored in a computer-readable memory that can direct a computer or other programmable computing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable computing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the system 200, and at least some outputs in such examples correspond to data representing computing-side actions and communications in two-way communications between a user 110 and a system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The system 200 can offer any number or type of services and products to one or more users 110. In some examples, a system 200 offers products. In some examples, a system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the system 200, automated assistance may be provided by the system 200. For example, automated access to user accounts and replies to inquiries may be provided by computing-side automated voice, text, and graphical display communications and interactions. In at least some examples, any number of human agents 210 can be employed, utilized, authorized or referred by the system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt computing-side actions and communications offering services and products of the system 200, information thereof, or access thereto. At least some outputs by an agent device 212 in some examples correspond to, or are prompted by, user-side actions and communications in two-way communications between a user 110 and a computing-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the system 200, which may satisfy user requests or prompts by voice, text, or online functions, and may refer users to one or more human agents 210 once preliminary determinations or conditions are made or met.

A computing system 206 of the system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include a computing or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the system 200 in back-end transactions clearing processes.

In certain embodiments, one or more of the systems such as the user device 106, the system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology.

In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The invention relates generally to generating pop-ups for services and products, and more particularly embodiments of the invention relate to generating such pop-ups in real-time to a user portable device based upon the user location using the user system 100 and the system 200 shown in FIG. 1. A pop-up usually is a small window that appears in the foreground of a display screen of a computing device. The user 110 accesses a portable device with display, processing and communication capabilities such as the computer 104, the mobile device 106, or an information/entertainment system of a vehicle (not shown). A software application, such as a pop-up display software application 132, running on the portable device establishes a wireless communication channel with the system 200. In response to user data generated by the application 132, either automatically or manually by the user, a software application, such as a pop-up generation software application 232, running on the computing system 206 of the system 200 generates pop-up data to the portable device, the pop-up data being related to at least one business or target for products and/or services. As explained below, the pop-up data includes information related to the identity of the target, the location of the target and the terms of the pop-up. Thus, the system 200 functions as a pop-up generator to send location-based pop-ups in real-time to the portable device.

The display 140 of the mobile device 106 is shown in FIG. 7 and illustrates an embodiment of the invention. As an example, the system 200 can be a financial business that provides a downloadable application 132 to enable the user 110 to complete financial transactions and display pop-ups on the mobile device 106. When the user starts the application 132, a graphical user interface (GUI) 700 is generated on the display 140. A section 702 of the GUI 700 represents one or more areas that present information to the user 110 and enable the user to interact with the system 200 remotely. As shown in FIG. 1, the mobile device 106 includes a GPS device 108 that can inform the computing system 206 as to the current, real-time location of the mobile device. Typically, the GPS location function must be activated by the user 110 in order to transmit the location information.

Based upon the location of the mobile device, the application 232 running on the computing system 206 sends selected information as the pop-up data to the application 132. The mobile device 106 responds to the pop-up data by generating pop-up images 704, 706, 708 on the display 140. Although three images are shown, any number of images can be displayed limited by the number of relevant pop-ups that are available and the size of the areas required to display the information to the user 110. Also, scrolling is available when the number of pop-up images exceeds the capacity of the display 140. While this pop-up image generation procedure can take place automatically, the user 110 may not want to see pop-ups at various times. A button 710 can be included in the GUI 700 to enable the user to turn on and off the pop-up function. The application 132 also can switch from the GUI 700 screen to a separate screen (not shown) to show the pop-up images 704, 706, 708.

FIG. 8 illustrates a flow chart representing a pop-up generation method 800, according to at least one embodiment of the invention, of operating a location-based real-time pop-up generator. In a step 802, the system 200 establishes a first database in the storage device 224 of data 234 related to a plurality of targets that desire to provide products or services to the users 110 associated with the system 200. The data 234 for each of the targets includes the GPS location of the target and information sufficient to generate an associated pop-up image 704, 706, 708. In a step 804, the system 200 establishes a second database in the storage device 224 of data 234 related to a plurality of users that desire to receive pop-ups from at least one of the targets in the first database. The first and second databases can be combined in a single database. The data 234 for each of the users is a user profile that includes information as to preferences for types of targets and/or individual targets and/or products and/or services. In a step 806, the user profile preference information can be supplemented from actual transaction information such as the information generated from credit/debit card use.

In a step 808, the computing system 206 responds to receiving the user data while the application 132 is running and, if necessary after the activation of the button 710, to identify the mobile device 106 (user identification) and the current location of the mobile device 106. In a step 810, the computing system retrieves from the second database the user profile portion of the data 234 associated with identified mobile device 106. In a step 812, the computing system 206 compares the current location of the identified mobile device 106 with the target locations stored in the first database and selects one or more targets located within a predetermined distance of the current location of the identified mobile device 106. In a step 814, the computing system 206 evaluates the data associated with the selected targets and sends the information matching the user preferences as the pop-up data to the identified mobile device 106 for presentation to the user 110 as the images 704, 706, 708.

In a step 816, the computing system updates the information in the first and second databases when required and returns to the step 808 to repeat the method in response to the next user activation or location change. The updated information can include changes in the pop-ups, addition or deletion of targets and changes in the user preferences. The pop-up generation method 800 also can include machine learning functions as illustrated in FIG. 6. In a step 818, the pop-up generation application 232 is notified by the mobile device 106 as the pop-ups are utilized by the user 110. The application 232 then processes the utilization information to instruct the proposal display application 132 to organize the pop-up display images 704, 706, 708 according to use by displaying them in descending frequency of use with the most used target as the top image 704. The application 232 also can learn the use patterns of the user 110 so that proposals from certain types of targets are displayed during associated time periods. For example, proposals from restaurants are displayed during time periods when the user 110 has a pattern of selecting restaurant pop-ups. The application 232 also can process credit/debit card transaction data to determine patterns of use. The learned patterns of use are added to the user profiles in the second database.

The pop-ups can be generated in association with predetermined dates. For example, the proposals can be associated with a scheduled event and the pop-ups generated only on dates associated with the event. The proposals can be associated with a holiday and relate to products and services that relate to the holiday. The proposals can be associated with a birthday or anniversary celebrated by the user. The preferences in the user profile can be updated from learned patterns of the user transactions associated with such predetermined dates.

FIG. 9 is a flow chart representing a pop-up display method 900, according to at least one embodiment of the invention, for displaying location-based real-time pop-ups on a portable device. Using the mobile device 106 shown in FIG. 7 as an example, in a step 902 the user 110 opens the pop-up display application 132 to generate the GUI 700 on the display 140. As an option, in a step 904 the user 110 can actuate the button 710 to activate the pop-up function described above. In a step 906, the mobile device 106 sends the user data including an identification of the user 110 and the current location of the mobile device 106 to the system 200. The user identification can be based upon a user name and password required to start the pop-up display application 132. In a step 908, the mobile device 106 receives relevant information as the pop-up data from the system 200 and displays the pop-up images 704, 706, 708.

The pop-up images 704, 706, 708 can include one or more of a code to be used at the time of purchase, a QR code to be scanned at the time of purchase and an interactive screen area for remotely placing an order. The application 132 operates the mobile device 106 to send transaction information to the system 200 in a step 910 for updating the user profile.

The system and method according to the invention provide a significant advantage of reducing the flow rate across the wireless communication channel between the portable device (mobile device 106) and the computing system 206. This advantage is achieved by only transmitting the pop-up data when the portable device current location is within a predetermined distance of the location of one or more targets. Thus, pop-up data associated with a target is not being transmitted periodically when the portable device is not within the predetermined distance from the target location.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for controlling location-based real-time pop-up images on user portable devices and reducing communication channel flow rate by reducing a number of pop-up images transmitted across a communication channel, the system comprising:
a database; and
a computing system operatively coupled with the database and wirelessly operatively coupled over a wireless communication channel with one or more user portable devices comprising:
at least one processor;
a communication interface communicatively coupled to the at least one processor; and
a memory device storing executable code that, when executed, causes the at least one processor to:
utilize machine learning framework hardware that is leveraged by an AI program to perform operations associated with training a neural network to predict a display order for displaying at least two pop-up images in order to reduce data flow across the wireless communication channel, the display order being trained to at least partially incorporate transaction data, the training of the neural network including:
inserting training test data into an iterative training and testing loop to predict a target variable; and
adjusting, after each iteration of the iterative training and testing loop, weight coefficients assigned to nodes of the neural network, the adjusting continuing until an error in the output data generated by the iterative training and testing loop is less than a predetermined level:
deploy the trained neural network;
run a pop-up generation software application that stores pop-up data for a plurality of pop-up images and stores user profile data of user profiles for a respective plurality of users in the database, the pop-up data for each of the pop-up images including a location for a target associated with each respective pop-up image of the plurality of pop-up images;
receive, across the wireless communication channel, user location data including user identification, user transaction information, and current location information from a user operated portable device, the user identification corresponding to one of the stored user profiles, the current location information being obtained via a positioning system utilizing a GPS device that includes a transceiver such that the positioning system wirelessly transmits and receives global positioning signals associated with the user operated portable device to determine positioning of the user operated portable device;
update the one stored user profile using at least the user transaction information;
respond to receiving the user location data by comparing the current location information with the locations included in the stored pop-up data and, based at least in part on the one stored user profile corresponding to the user identification, select stored pop-up data associated with multiple pop-up images each having an associated location within a predetermined distance of the current location;
inserting the user transaction information into the deployed neural network to predict an order to display the multiple pop-up images, the order being determined based at least in part upon a transaction frequency of the user according to the transaction information in the one stored user profile; and
transmit information from the stored pop-up data associated with the selected multiple pop-up images as sent pop-up data to the user operated portable device with instructions to display the selected multiple pop-up images via a user interface of the user operated portable device, wherein sent pop-up data is only transmitted across the wireless communication channel in the order and when the user operated portable device's current location is within the predetermined distance of the associated location rather than periodically transmitted, thereby reducing a flow rate of the sent pop-up data across the wireless communication channel,
wherein the instructions to display the multiple pop-up images includes the order in which to display the multiple pop-up images.

2. The system according to claim 1 wherein the one stored user profile includes at least one user preference corresponding to at least one of a business type, a business, a service and a product and the computing system uses the at least one user preference to select the stored pop-up data associated with multiple pop-up images.

3. The system according to claim 1 wherein at least one of the multiple pop-up images includes at least one of a code to be used at a time of purchase, a QR code to be scanned at the time of purchase and an interactive screen area for remotely placing an order.

4. The system according to claim 1 wherein the computing system is adapted to enable the portable device to download a pop-up display software application for generating user data for the one user profile, for receiving the sent pop-up data and for operating the portable device to display the multiple pop-up images.

5. A computer-implemented method for generating location-based real-time pop-up images for distribution to user operated portable devices and reducing communication channel flow rate by reducing a number of pop-up images transmitted across the communication channel, the method comprising the steps of:
establishing a first database of stored pop-up data related respectively to a plurality of targets that desire to send pop-up data to one or more user portable devices associated with a computing system, the stored pop-up data for each of the targets including a location of a target and information sufficient to generate an associated pop-up image;
establishing a second database of stored user profile data of user profiles related respectively to a plurality of the users associated with the computing system that desire to receive the pop-up data from at least one of the targets for which stored pop-up data is stored in the first database;

utilizing machine learning framework hardware that is leveraged by an AI program to perform operations associated with training a neural network to predict a display order for displaying at least two pop-up images in order to reduce data flow across the wireless communication channel, the display order being trained to at least partially incorporate transaction data, the training of the neural network including:
inserting training test data into an iterative training and testing loop to predict a target variable; and
adjusting, after each iteration of the iterative training and testing loop, weight coefficients assigned to nodes of the neural network, the adjusting continuing until an error in the output data generated by the iterative training and testing loop is less than a predetermined level: deploying the trained neural network;
operating a computing system to receive user location data across a wireless communication channel, the received user location data including a user identification, user transaction information, and a current location of a portable device sending the user location data, the current location being obtained via a positioning system utilizing a GPS device that includes a transceiver such that the positioning system wirelessly transmits and receives global positioning signals associated with the user operated portable device to determine positioning of the user operated portable device;
operating the computing system to retrieve from the second database user information data from one stored user profile related to the user corresponding to the user identification;
operating the computing system to compare the received user location data that includes the current location with the stored pop-up data that includes target locations stored in the first database and, based at least in part on the one stored user profile related to the user corresponding to the user identification, to select targets that are located within a predetermined distance of the current location;
inserting the user transaction information into the deployed neural network to predict an order to display the multiple pop-up images, the order being determined based at least in part upon a transaction frequency of the user according to the transaction information in the one stored user profile; and
operating the computing system to send pop-up data, which includes the order, across the wireless communication channel to the portable device that sent the user location data, the sent pop-up data including pop-up images associated with the selected targets, wherein the portable device receives and displays, via a user interface, the pop-up images from the sent pop-up data, and wherein the sent pop-up data is only transmitted across the wireless communication channel in the order and when the portable device current location is within the predetermined distance of the selected target location rather than periodically transmitted, thereby reducing a flow rate of sent pop-up data across the wireless communication channel.

6. The method according to claim 5, each of the user profiles including preferences for at least one of types of the targets, individual ones of the targets, products from the targets and services from the targets, the method further including operating the computing system to select ones of the targets that further match the preferences.

7. The method according to claim 6 including operating the computing system to update the preferences based upon actual transaction information generated from purchase transactions made by the user.

8. The method according to claim 7 wherein the computing system generates the actual transaction information from credit card and debit card transactions made by the user.

9. The method according to claim 5 wherein the computing system further selects the targets based upon learned use patterns of the user.

10. A computer-implemented method for displaying, via a user interface of a portable device, location-based real-time pop-ups on portable devices and reducing communication channel flow rate by reducing a number of pop-ups transmitted across the communication channel, the method comprising the steps of:
operating the portable device to transmit user location data to a computing system across a wireless communication channel, the user data including a user identification, purchase transaction information, and a current location of the portable device, the current location being obtained via a positioning system utilizing a GPS device that includes a transceiver such that the positioning system wirelessly transmits and receives global positioning signals associated with the user operated portable device to determine positioning of the user operated portable device;
updating user profile data of a stored user profile associated with the user identification using at least the purchase transaction information;
operating the portable device to receive pop-up data sent from the computing system across the wireless communication channel, the sent pop-up data including pop-up images related to products and services offered by targets located within a predetermined distance of the current location; and
operating the portable device to process the sent pop-up data and display the pop-up images, via the user interface, wherein the sent pop-up data is only transmitted across the wireless communication channel in an image order and when the portable device current location is within the predetermined distance from the locations of the targets according to stored pop-up data stored by the computing system rather than periodically transmitted,
wherein the sent pop-up data is selected from the stored pop-up data by the computing system based at least in part on the user profile data of the stored user profile by the computing system and corresponding to the user identification, thereby reducing a flow rate of the sent pop-up data across the communication channel,
wherein operating the portable device to process the pop-up data and show the pop-up images comprises showing the pop-up images on the user interface in an order determined by machine learning framework hardware that is leveraged by an AI program to perform operations associated with training a neural network to predict the image order for display in order to reduce data flow across the wireless communication channel, the neural network being trained to at least partially incorporate transaction data to determine the image order, the training of the neural network including inserting training test data into an iterative training and testing loop to predict a target variable and adjusting, after each iteration of the training and testing loop, weight coefficients assigned to nodes of the neural network, the adjusting continuing until an error in output data generated by the iterative training and testing loop is less than a predetermined level, and the purchase transaction information has been inserted into the neural network, once deployed, to predict the image order of the pop-up images based at least in part upon a transaction frequency of the user according to the purchase transaction information in the user profile data of the stored user profile.

11. The method according to claim 10, wherein the user interface comprises a graphical user interface.

12. The method according to claim 10, wherein the user interface comprises a button, and wherein the step of operating the portable device to transmit the user location data is enabled by the user actuating the button.

13. The method according to claim 10 wherein the user identification is based upon a user name and a password required to communicate with the computing system.

14. The method according to claim 10 wherein the pop-up images include at least one of a code to be used at the time of purchase, a QR code to be scanned at the time of purchase and an interactive screen area for remotely placing an order.

15. The method according to claim 10 including operating the portable device to send preference information to the computing system for updating the stored user profile of the user, the preference information including at least one of a target type, a target, a service from a target and a product from a target.

16. The system according to claim 1 wherein the order, in which the multiple pop-up images are to be displayed, is in descending frequency of use by the user according to the transaction information in the one stored user profile.

17. The system according to claim 1, wherein the computing system further selects the multiple pop-ups based at least in part upon time-period based learned use patterns of the user.

18. The method according to claim 5, wherein the order, in which the pop-up images are to be displayed, is in descending frequency of use by the user according to the transaction information in the one stored user profile.

19. The method according to claim 5, wherein operating the computing system to select targets comprises operating the computing system to select the targets based at least in part upon time-period based learned use patterns of the user.

20. The method according to claim 10, wherein showing the pop-up images on the user interface in the order comprises showing the target images in an order of descending frequency of use by the user according to the transaction information in the one stored user profile.

* * * * *